(12) United States Patent
Ansell et al.

(10) Patent No.: US 6,869,549 B2
(45) Date of Patent: Mar. 22, 2005

(54) METHOD AND MOLD FOR MAKING OPHTHALMIC DEVICES

(75) Inventors: Scott Frederick Ansell, Jacksonville, FL (US); Michael W. Litwin, Jacksonville, FL (US); Gregory L. Berckmiller, Jacksonville, FL (US); Timothy P. Freeman, Jacksonville, FL (US); Richard J. Fox, Jacksonville, FL (US); Robert B. Phillips, Orange Park, FL (US); Thomas R. Daniels, Jacksonville, FL (US); Richard F. Barbas, Jacksonville, FL (US); Gerald R. Krebsbach, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 197 days.

(21) Appl. No.: 10/228,719

(22) Filed: Aug. 27, 2002

(65) Prior Publication Data
US 2003/0062640 A1 Apr. 3, 2003

(51) Int. Cl.$^7$ ............................................. B29D 11/00
(52) U.S. Cl. ..................... 264/2.3; 264/2.5; 425/437; 425/556; 425/808
(58) Field of Search ........................ 264/2.2, 2.3, 2.5, 264/328.1, 335; 425/437, 455, 556, 808

(56) References Cited

U.S. PATENT DOCUMENTS

| | | | |
|---|---|---|---|
| 3,830,460 A | 8/1974 | Beattie | |
| 3,931,373 A | 1/1976 | Beattie | |
| 4,091,057 A | 5/1978 | Weber | |
| 4,159,292 A | 6/1979 | Neefe | |
| 4,173,492 A | 11/1979 | Pollard | |
| 4,626,566 A | 12/1986 | Miller et al. | |
| 4,812,428 A | 3/1989 | Kohut | |
| 4,880,759 A | 11/1989 | Kohut | |
| 4,981,727 A | 1/1991 | Brinduse et al. | |
| 5,264,161 A | 11/1993 | Druskis et al. | |
| 5,337,928 A | 8/1994 | Foster et al. | |
| 5,540,582 A | 7/1996 | Catalanotti et al. | |
| 5,542,978 A | 8/1996 | Kindt-Larsen et al. | |
| 5,589,130 A | 12/1996 | Takada et al. | |
| 5,605,656 A | 2/1997 | Sasano | |
| 5,620,650 A | 4/1997 | Nakajima et al. | |
| 5,639,510 A | 6/1997 | Kindt-Larsen et al. | |
| 5,674,557 A | 10/1997 | Widman et al. | |
| 5,681,510 A | 10/1997 | Valint, Jr. et al. | |
| 5,702,735 A | 12/1997 | Martin et al. | |
| 5,750,060 A | 5/1998 | Maus et al. | |
| 5,812,402 A | 9/1998 | Nishiyama et al. | |

FOREIGN PATENT DOCUMENTS

EP  1052075 A2 * 11/2000

OTHER PUBLICATIONS

PCT International Search Report PCT/US02/27487 dated Dec. 11, 2002.

*Primary Examiner*—James P. Mackey
*Assistant Examiner*—Donald Heckenberg (57) ABSTRACT

This invention provides a method and a mold for improving the release of a molded ophthalmic device from a mold. The method comprises the steps of: providing a first mold half and second mold half each having opposing top surfaces at least one of which has been hollowed out to define a cavity for forming said ophthalmic device and at least said first mold half further defining a boundary for a release element, said boundary is part of said cavity, said release element comprising a ramped surface, said cavity having a corresponding ramped surface, and said release element having its widest part near the top surface of said at least said first mold half that defines said release element therein. The mold of this invention has a hollowed-out portion as part of the cavity to provide a release element to the molded ophthalmic device.

16 Claims, 6 Drawing Sheets

U.S. PATENT DOCUMENTS

| | | |
|---|---|---|
| 5,837,314 A | 11/1998 | Beaton et al. |
| 5,852,158 A | 12/1998 | De Bont et al. |
| 5,861,114 A | 1/1999 | Roffman et al. |
| 5,908,680 A | 6/1999 | Moren et al. |
| 5,935,622 A | 8/1999 | Pott et al. |
| 5,982,565 A | 11/1999 | Nomura et al. |
| 6,116,891 A | 9/2000 | Starkey |
| 6,192,327 B1 | 2/2001 | Nishiyama et al. |
| 6,327,553 B1 | 12/2001 | Nishiyama et al. |

* cited by examiner

METHOD AND MOLD FOR MAKING OPHTHALMIC DEVICES

FIELD OF THE INVENTION

The present invention relates generally to a mold for making ophthalmic devices and more particularly to a mold for making lens curves for molding contact lenses.

BACKGROUND OF THE INVENTION

U.S. Pat. No. 5,702,735 to Martin et al., the entire disclosure of which is hereby incorporated by reference, provides an apparatus for molding polystyrene lens curves, i.e., front curves or back curves, which are used for subsequent molding of soft contact lenses. The apparatus is designed to provide superior heat conduction capacity so as to minimize the molding cycle time, while simultaneously producing uniformly precise and accurate optical quality surfaces. Molten polystyrene is provided via a hot runner system to a plurality of mold cavities. In a mold used to make front curves, the convex surfaces of the mold provide the optical quality surfaces to the concave surfaces of the front curves produced thereby. In a mold used to make back curves, the concave surfaces of the mold provide the optical quality surfaces to the convex surfaces of the back curves produced thereby. The structural element which defines each convex surface includes a hollow cylindrical bushing and a removable power insert mounted therein, which may be changed so that the prescription strength of the contact lens to be formed by the lens curves may be varied. In a first embodiment, the power insert includes only a convex surface at its operational end. In a second embodiment, the power insert includes an annular flat surface surrounding the convex surface, defining at the junction therebetween a discontinuity of curvature, which imparts a sharp edge to the front curve formed thereby. Cooling water is pumped into the core of the inserts to cool the inserts during the molding process, which complicates the process of changing the inserts. The power insert may be constructed of various materials including pure steel, brass, copper chromium, or cobalt-nickel alloyed martensitic steel. The power insert may be coated with a surface layer of nickel phosphor or silicone oxide, or chrome nitride. U.S. Pat. No. 4,565,348 to Larsen, which is also incorporated by reference, discloses another prior art approach to manufacturing lens curves. Pursuant to this prior art approach, the lens curves are molded as a set of eight lens curves carried on a frame in a 2×4 array. FIG. 3 of the Larsen patent illustrates a molded frame carrying a 2×4 array of concave front curves, while FIG. 5 therein shows a molded frame carrying a 2×4 array of back curves. The cluster assembly of the frame and lens curves is manufactured by injection molding the assembly as one piece with the lens curves being secured within an outer rectangular frame by small struts extending between the frame and the lens curves. The height of the frame is such that the surfaces of the lens curves are protected from scratching and mechanical damage during handling, and the frame in general has a shape facilitating stacking and handling. This prior art approach of molding such polystyrene lens curves in a cluster assembly typically takes approximately twenty-four (24) seconds, which is too long for the efficient production of such polystyrene lens curves.

In this prior art approach, complementary sets of front and back curves are used in the production of hydrogel contact lenses by molding a reaction mixture wherein the mixture is preferably dissolved in a non-aqueous, water-displaceable solvent. After a dosing step in which the front curves are substantially filled with the reaction mixture, the concave front curves are covered with the back curves in a manner in which no air bubbles are trapped beneath the back curves. Back curves are placed on the polymerizable mixture in the front curves as individual units; therefore, prior to this step, the back curves are separated from their frames by breaking or cutting. The back curves are preferably held by a mechanical device while they are separated from the frame which thereafter places the back curves on the front curves. The reaction mixture is then subjected to conditions whereby it polymerizes, e.g. irradiation with actinic visible or ultraviolet radiation, to thereby produce a polymer in the shape of the desired hydrogel lens. After the polymerization process is completed, the two lens curves are separated (called demolding), typically leaving the contact lens in the front curve, from which it is subsequently displaced. Typically the front and back curves are used once to mold a single contact lens. After the polymerization is complete, the diluent is displaced with water to produce a hydrated lens.

U.S. Pat. No. 5,782,460, and WO 98/42497 disclose a method of making hydrogel contact lenses by molding a material which has been polymerized but is at least partially uncrosslinked within reusable molds. Crosslinking of the polymer is by UV radiation; therefore, the mold consists of a UV-permeable material, such as quartz, or polymeric materials. One or more contact lenses can be molded in each mold.

U.S. Pat. No. 5,451,155 to Kok et al., the entire disclosure of which is hereby incorporated by reference, discloses an arrangement for manufacturing goods, such as compact discs, by injection molding, providing a vertical injection molding machine including two holders that support mold plates. The mold plates are adjustable with respect to each other between a first position, in which the molding plates define a cavity, into which material is injected by the injection molding machine during operation, so that the particular molded good is formed, and a second position, in which the molding plates have been moved some distance apart, while the formed good is being removed. On each side of the injection molding machine, transport devices are provided which move the holder and molding plates from a position located at some distance from the injection molding machine to a position suitable for cooperation with the injection molding machine. The transport devices and the holders are detachably coupled. It is also disclosed that a holder may be provided with a new molding plate at some distance from the machine while the machine is in operation. For exchanging the molding plates and holders, it is only necessary to discharge the holder supporting the molding plate used so far, and to move the new holder and molding plate into position. This type of exchange of molding plates provides for a quick and simple retooling while minimizing the downtime of the injection molding operation.

U.S. Ser. No. 09/305,886 filed May 5, 1999 (VTN-424) entitled "Mold, Molding System & Molding Machine For Making Ophthalmic Devices", assigned to the same assignee, provides a mold having a first mold half that works in conjunction with a second mold half for forming ophthalmic devices. At least one mold half has at least one changeable cassette comprising inserts for forming ophthalmic devices. The mold can be used to make ophthalmic devices, preferably in an automated molding machine, more preferably in an injection molding machine. The mold is preferably used to make lens curves which are in turn used to make contact lenses. The invention further provides a vertical injection molding machine comprising a mold, having at least one cassette, in which the machine can quickly change one mold half for another, and the machine is capable of making ophthalmic devices.

There is a need in the art for a method and mold that provides for improved release of molded ophthalmic devices from the molds in which they are formed.

SUMMARY OF THE INVENTION

This invention provides a method and a mold for improving the release of a molded ophthalmic device from a mold. The method comprises the steps of: providing a first mold half and second mold half each having opposing top surfaces at least one of which has been hollowed out to define a cavity for forming said ophthalmic device and at least said first mold half further defining a boundary for a release element, said boundary is part of said cavity, said release element comprising a ramped surface, said cavity having a corresponding ramped surface, and said release element having its widest part near the top surface of said at least said first mold half that defines said release element therein.

This invention further provides a mold for forming an ophthalmic device, said mold comprising a first mold half and second mold half each having opposing top surfaces at least one of said top surfaces has been hollowed out to define a cavity for forming said ophthalmic device, and at least said first mold half having a hollowed-out portion defining a release element, said hollowed-out portion being part of said cavity, said hollowed-out portion comprising a ramped surface, and being widest near the top surface of said at least said first mold half.

This invention improves the reliability of release and therefore removal of the ophthalmic devices from the mold. Prior to using the release element of this invention, even with the use of air ejection on both mold halves, the molded ophthalmic devices did not consistently and reliably release from the mold. With the use of the release element preferably in combination with the air ejection, the ophthalmic devices release from the mold every time, which avoids any down time for the molding machine due to molded parts that are stuck in the mold and must be removed by an operator.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

The method and mold of this invention can be used to mold ophthalmic devices using any molding techniques; however, this invention is particularly well-suited for the formation of a molded ophthalmic device in a mold that involves shrinkage and/or air ejection of the molded device. Preferably the molding technique that is used involves the molding of a thermoplastic, preferably by injection molding. Preferably the thermoplastic material is heated prior to injection into the mold and is cooled for a period of time when in the mold, preferably for less than four seconds, prior to removing the molded part from the mold. In addition to injection molding, this invention can be used in other molding processes, such as coining, compression molding, and thermoforming under a vacuum, and the like.

The front curves and back curves of this invention are preferably made using improved molds preferably in injection molding machines. The improvements will be described herein; aspects of the mold or molding process not described herein are as described in U.S. Pat. No. 5,545,366, U.S. Pat. No. 5,451,155, and U.S. Ser. No. 09/305,886 (VTN-424), incorporated herein by reference, or otherwise known to a person of ordinary skill in the art.

In the molding method of the invention, a first mold half and a second mold half are used to mold the ophthalmic device. The mold halves work in conjunction with each other, and are adjustable with respect to each other between a first position, in which the mold halves form a mold cavity into which a material is or has been introduced so as to form molded ophthalmic devices, and a second position, in which the mold halves have been moved some distance apart preferably while means are provided for removing the molded ophthalmic devices.

The method and the mold of this invention can be used to make ophthalmic devices, such as, contact lenses, interocular lenses, other types of lenses, and plastic molded parts, e.g., lens curves used for making contact lenses. The preferred use for the molds is to make contact lenses, or plastic molded parts for ophthalmic devices, more preferably plastic molded parts for making contact lenses, most preferably lens curves.

The molds will be described for the preferred embodiment; however, this invention is not limited to the embodiment described and can be modified and used to make other ophthalmic devices.

In the preferred embodiment the method and the mold of this invention are used to form "lens curves", i.e. "front curves" and "back curves". In the prior art lens curves, i.e. front curves and back curves have been referred to as molds or mold halves for making contact lenses. The terms "mold" and "mold halves" will not be used herein to describe the lens curves although the lens curves are used for molding contact lenses. The terms "mold" and "mold halves" will be used to describe the mold and the mold half used to form the ophthalmic devices (e.g. lens curves).

Figure 1:
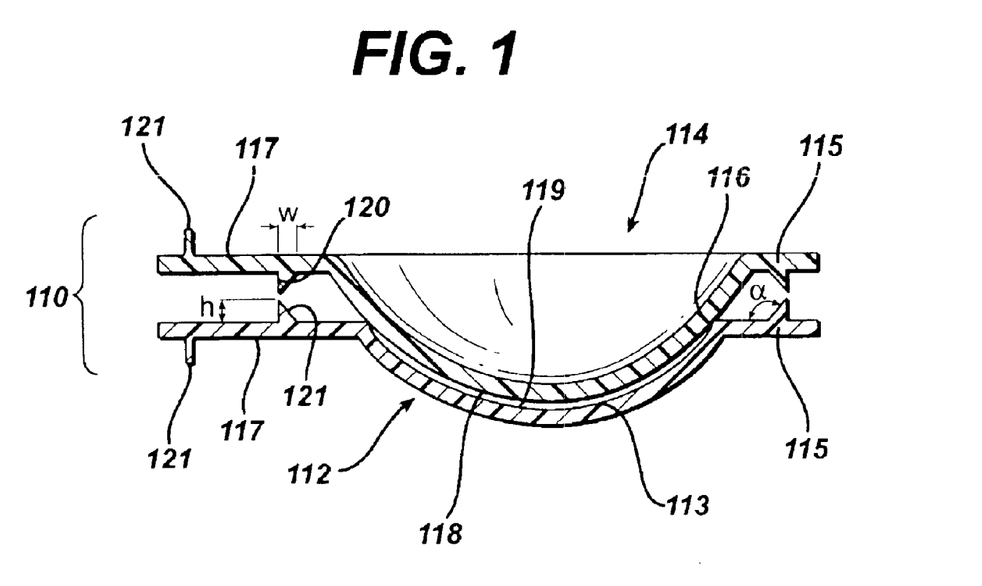
FIG. 1 is a side elevational view of a front curve and back curve assembly, which includes a front curve, and back curve.

FIG. 1 shows the preferred lens curve assembly 110, the individual pieces are made using the mold of this invention. The mold will be described below. The lens curve assembly 110 consists of a front curve 112 and back curve 114 which defines an opening 113 in which a contact lens reaction mixture is polymerized or crosslinked to form a contact lens.

The front curve 112 and back curve 114 consist of a plastic material, preferably polystyrene, polypropylene, cycloolefins, or the like, and are made within the first and second mold halves of this invention (described below), preferably in an injection molding machine. The front curve 112 and back curve 114 are similar to those disclosed and used in the prior art to make contact lenses, for example, as described in U.S. Pat. No. 5,545,366, incorporated herein by reference. The lens curves can also be formed on a frame as disclosed in U.S. Pat. No. 4,565,348 incorporated herein by reference. Presently it is preferred that the lens curves are individually molded parts that are not connected to each other via a frame. The front curve 112 has a central curved section with an optical quality concave surface 119 which preferably has a circular circumferential defined edge 116 extending therearound. The concave surface 119 has the dimensions, preferably the power of the front surface of a contact lens to be produced in the lens assembly 110. The front curve has a preferred thickness between 0.2 mm and 1.0 mm; most preferably the thickness is about 0.6 mm.

The back curve 114 has a central curved section with an optical quality convex surface 118. The back curve 114 has the dimensions of the back surface of a contact lens to be produced by the lens assembly 110, and e.g. for a toric lens defines the cylinder power. The back curve 114 has a preferred thickness between 0.2 mm and 1.0 mm; most preferably the thickness is about 0.6 mm. It is preferred that the front curve and the back curve have the same thickness, although that is not required for the benefits of this invention. The front curve 112 and back curve 114 each comprise annular flanges 115, and tabs 117 which are integral with and project from one side of the flanges 115. The front curve 112 and back curve 114 are shown having gate vestiges 121 which sometimes form at the gate or injection hot tip, which supplies molten thermoplastic in the preferred embodiment to the mold used to form the front curve 112 and back curve 114.

The preferred tabs have a flat rounded-triangle shape without a step to break up the flow of the polymer into the mold. The weight of thermoplastic used to form the front curve or back curve is preferably less than 0.5 gm, more preferably less than 0.4 gm, and most preferably less than 0.3 gm.

The front curve and back curve formed by the method and using the mold of this invention further comprise release elements 120. The release elements are preferably molded contiguous that is as part of the front curve and/or back curve when the curves are molded, and comprise the same thermoplastic as the front curve and/or back curve. The release elements comprise at least one angled or ramped side or surface 121 that provides a surface, upon which when the thermoplastic material of the lens curve cools, the surface 121 travels and pushes against the complementary surface 531 in the mold cavity which formed surface 121 to help direct and preferably lift the part out of the mold half. The shrinkage of the material used to form the lens curve contracts the lens curve toward the center of mass of the lens curve, therefore, the shrinkage direction of the lens curve is approximately perpendicular to the removal direction of the lens curve from the mold. The removal direction of the lens curve from the mold is preferably perpendicular to the top surface of the mold 540; therefore, the shrinking force or contraction force of the material used to form the ophthalmic device against the ramp creates a force vector in the removal direction. Depending upon the removal and shrinking direction of a differently shaped ophthalmic device and mold, the release element may have to be modified, and placed in a different location on the part to use the shrinking force or contraction force and the release element to aid in the release of the ophthalmic device from the mold.

The release element preferably comprises an annular ring having a cross-section shaped like a fin, that is approximately a right triangle, or alternatively a triangle. Different shapes may be used as long as the release element provides a ramped surface for removal of the part from the mold. For example, the release element could have a cross-section of a tapered rectangle, trapezoid, or other shape with the widest point toward the top surface of the mold, that is, in the direction of removal of the molded device. Alternatively, the ramped or other surfaces of the release element could comprise a curved surface, preferably with a large radius of curvature; however planar surfaces are presently preferred.

It is preferred that the release element is an annular ring or the like so that all the forces acting on the part are close to symmetrical so that no distortion of the lens curves results; however for other devices, the shape of the release element may have to be modified to provide that the release forces are symmetrical on the molded part. Preferably the side opposite the ramped side is approximately perpendicular to the surface of the flange surface of the lens curve. An additional characteristic of the release element in the preferred embodiment is the angle alpha, as shown in FIG. 1, which is the angle of the ramp in the direction of the shrinking force. The angle alpha is preferably between 115° to 155°, more preferably between from 125° to 145°, and most preferably between from 130° to 140°. Angle alpha is also identified on FIG. 5, as the angle at which the boundary 530 of the hollowed-out portion of the top surface 540 of the mold is removed to be able to form the ramped surface 531 of the hollowed-out portion and the ramped surface 121 of the release element 120 of the molded ophthalmic device. The height h of the release element from the surface of the flange is preferably between from 0.050 mm to 0.250 mm, more preferably between from 0.075 mm to 0.200 mm and most preferably between from 0.100 mm to 0.150 mm. The width w of the release element along the surface of the flange is preferably between 0.050 mm to 0.250 mm, more preferably between from 0.075 mm to 0.200 mm and most preferably between from 0.100 mm to 0.150 mm. The height and width must be selected so that the release element does not subsequently interfere with the use of the ophthalmic devices after they are molded. As with the angle alpha, the height and width of the release element directly relate to the hollowed-out portion used to form the release element. The heights, widths and angles specified above for the release element were measured on the mold half, and therefore are 1–2 microns bigger than what is actually on the release element due to shrinkage. Different molding materials provide different shrinkage amounts which must be considered when designing the release element.

The location of the release element is preferably on the mid section of the flange of the lens curve as shown; however alternatively the release elements could be formed elsewhere on the lens curves or other ophthalmic devices. The location of the release element on an ophthalmic device is also determined by the shape of the mold and upon which mold half it is preferred that the molded part remains. If it were desired that the lens curves remain in the opposite mold half, then the release element would have been provided for on the opposite side of the flange, rather than as shown in FIG. 1, and the order of air ejection would be reversed as explained below.

Once the location of the release element on the part to be molded is determined, the boundary of the cavity in the mold half (or cassette or insert) is modified to provide for the release element. The cavity may be increased or decreased to provide for the release element. The boundary of the cavity is preferably increased to provide for the addition of release element to the cavity or the cavity may be decreased by a redesign of the device to provide for the release element. The cavity is the void defined by the mold halves for the formation of the ophthalmic device having the release element of this invention to be molded in the mold halves. The cavity may be hollowed-out into the mold half by milling, diamond point turning, lasering, lathing, grinding, or other known techniques, preferably by diamond point turning. The term "hollowed out" will used to describe the process of forming the cavity into the mold for molding the ophthalmic device and for forming the hollowed-out portion which forms the release element and is part of the cavity. It is understood that any process such as those described may be used to form the cavity and the hollowed-out portion which is part of the cavity. The hollowed-out portion may be formed either in a separate step or simultaneously as the rest of the cavity.

The location of the release element in the preferred embodiment of the present invention is determined by the use of and location of an insert in preferred mold half which will be described below.

Figure 2:
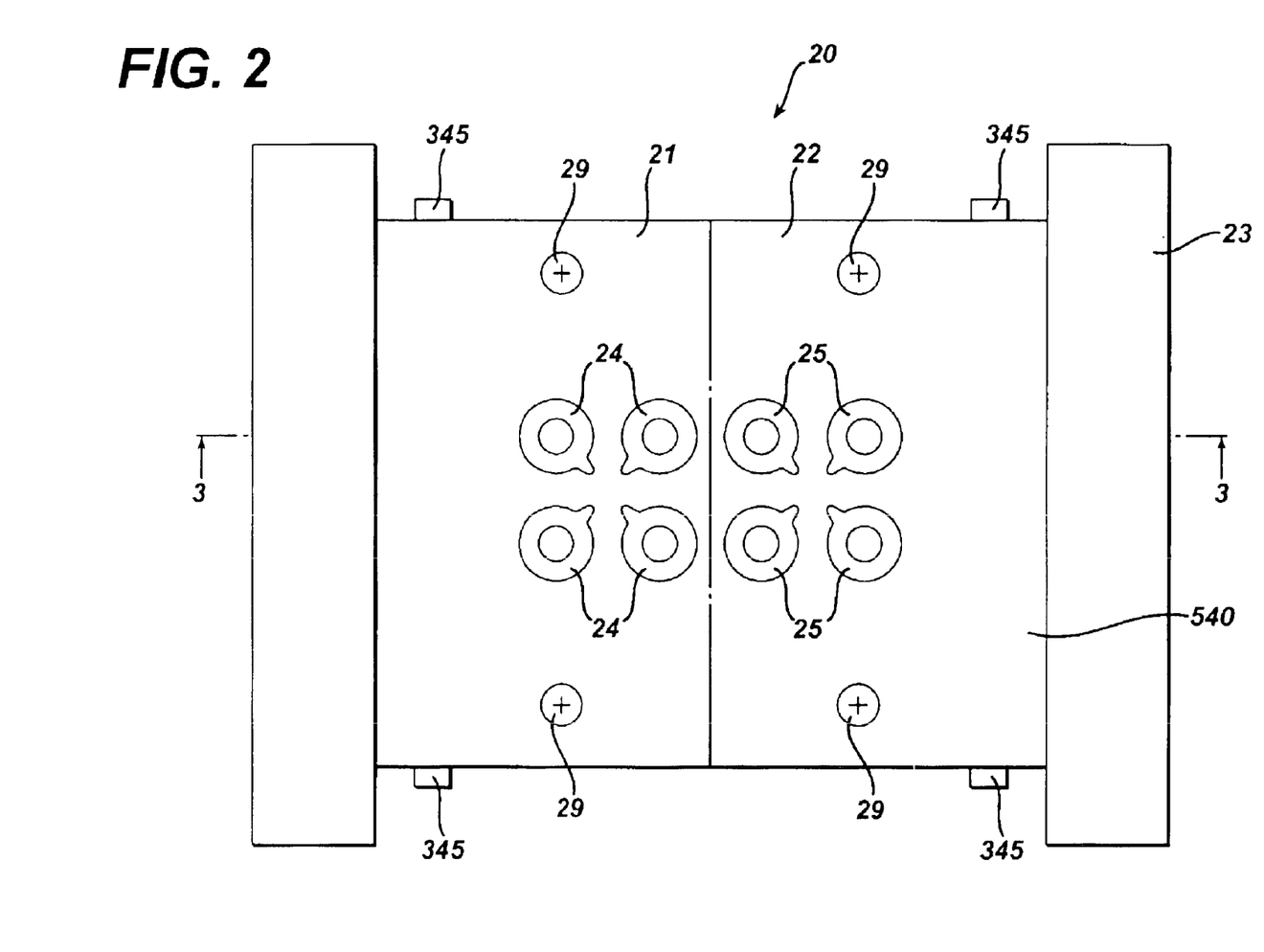
FIG. 2 is a top view of the first (lower) mold half shown in FIG. 3.
Figure 3:
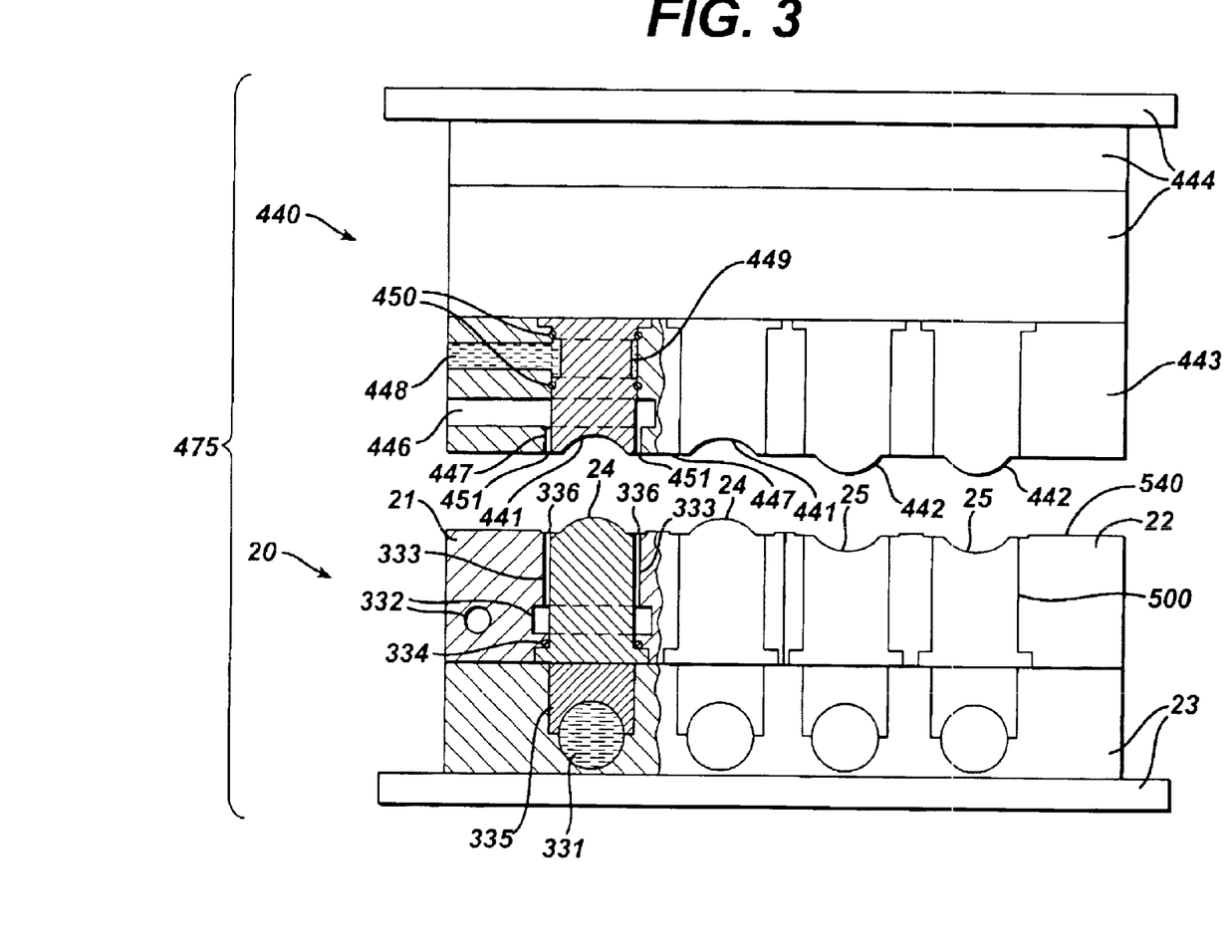
FIG. 3 is a cross-sectional view of a mold shown in the open position; the mold consists of first and second mold halves; the first mold half taken along the line 3—3 shown in FIG. 2.
Figure 4:
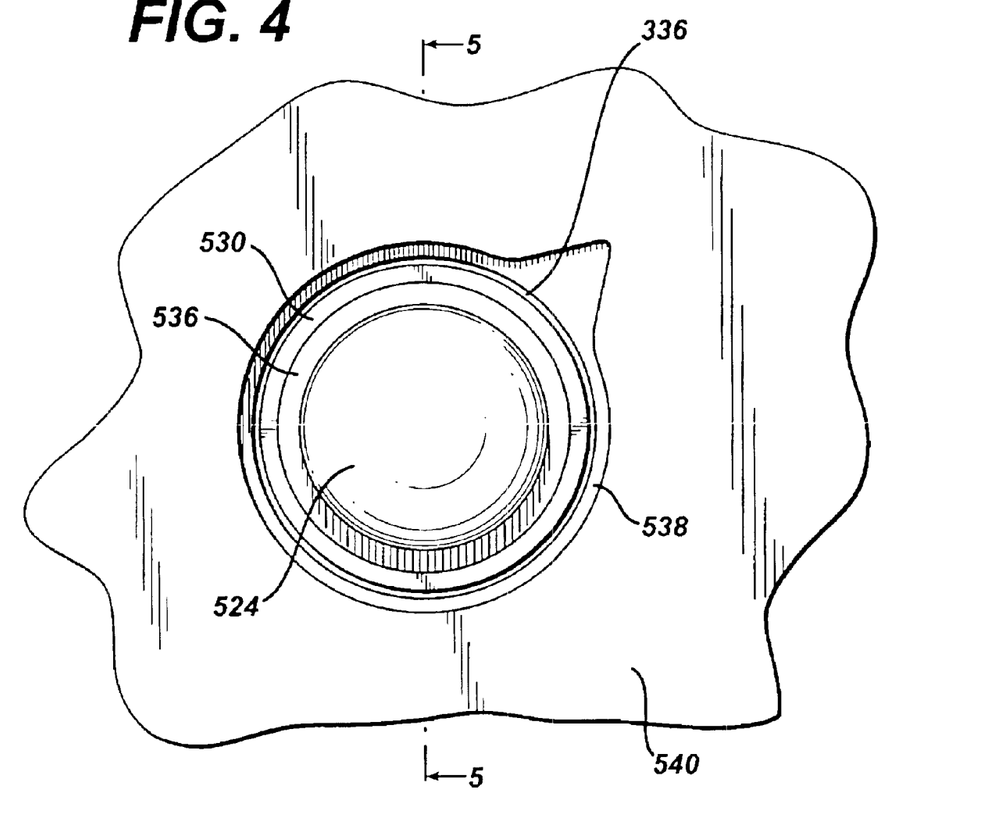
FIG. 4 is a detailed top view of a cutaway portion of the first mold half.

FIG. 2 shows a top view of the preferred first mold half 20 used for molding lens curves. The preferred mold comprising the first mold half 20 and a second mold half 440 is shown in FIG. 3. In the embodiment shown and described herein front curves 112 and back curves 114 are produced in a single mold; however, that is not a requirement for the invention. However, this invention applies to other molds used to make ophthalmic devices, e.g. molds that produce a plurality of individual front or back lens curves, or molds that each produce a single lens curve, or molds that produce a plurality of lens curves attached to a frame, or molds for molding other ophthalmic devices.

In the embodiment shown, the first mold half 20 preferably has two cassettes 21, 22 removably attached to a molding base 23. The cassettes 21, 22 are removably attached to the molding base 23 by two easily-accessible screws 29 per cassette or via alternative means e.g. braces, bolts, quick-clamps, and magnetism; The cassettes preferably have inserted into openings or bushings 500 within the cassettes a plurality of inserts 24, 25 which when mated with the second mold half form a cavity into which the thermoplastic material for forming the lens curves is placed. The inserts 24, 25 are preferably individually removable from the cassettes; however, alternatively the cassette may not have separate inserts placed within the cassette and instead the top surface of the cassette can be hollowed-out to provide the cavity and the hollowed-out portion that is part of the cavity or to define a portion of the cavity for the molded device, the other portion and boundary of the cavity being defined by the opposing mold half. Alternatively, the mold halves will not comprise cassettes and the mating opposing top surfaces of the mold halves will be hollowed out to form the cavity comprising the hollowed-out portion in which the device is molded. The molds described herein preferably comprise cassettes and/or inserts; however, as just stated it is not required that the mold halves comprise inserts or cassettes.

Preferably, each cassette comprises two to twenty inserts, more preferably four to ten inserts. The inserts, sometimes referred to as power inserts may be constructed of any material which can be made with an optical finish, such as metals, e.g., pure steel, brass, copper chromium, or cobalt-nickel alloyed martensitic steel. These layers may be turned to their proper thicknesses and dimensions by diamond cutters, and they may be thermally hardened. Alternatively, and particularly for the embodiment in which the mold comprising the inserts makes contact lenses directly, the inserts can comprise quartz, ceramics, or polymeric materials, such as, polycarbonates, cycloolefins, polystyrene, polypropylene, or poly(acrylonitrile).

As shown in FIGS. 2 and 3, cassette 21 holds front curve inserts 24 for forming (when properly mated with the second mold half 440) the front curves 112, and cassette 22 holds the back curve inserts 25 for forming (when properly mated with the second mold half 440) the back curves 114. The second mold half 440, has inserts which are complementary to the inserts 24, 25 in the first mold half 20 for forming the front curves 112 and back curves 114, respectively.

The cassettes preferably comprise metal, such as stainless steel, tool steel, high hardness machinable alloys; however, for an alternative embodiment, polymeric materials can be used to make the cassette. Most preferably nickel-plated tool steel is used to make the cassette. The metal of the cassette is preferably mechanically bored out to form openings 500 to receive the inserts. Other channels and passageways for the cooling water and air are also bored out (described in more detail below).

Figure 5:
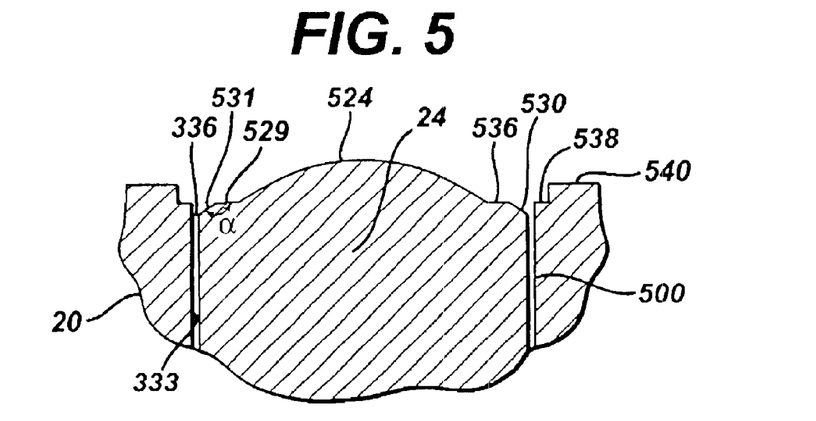
FIG. 5 is a cross-sectional view of a cutaway portion of the mold half shown in FIG. 4 taken along line 5—5 in FIG. 4.
Figure 6:
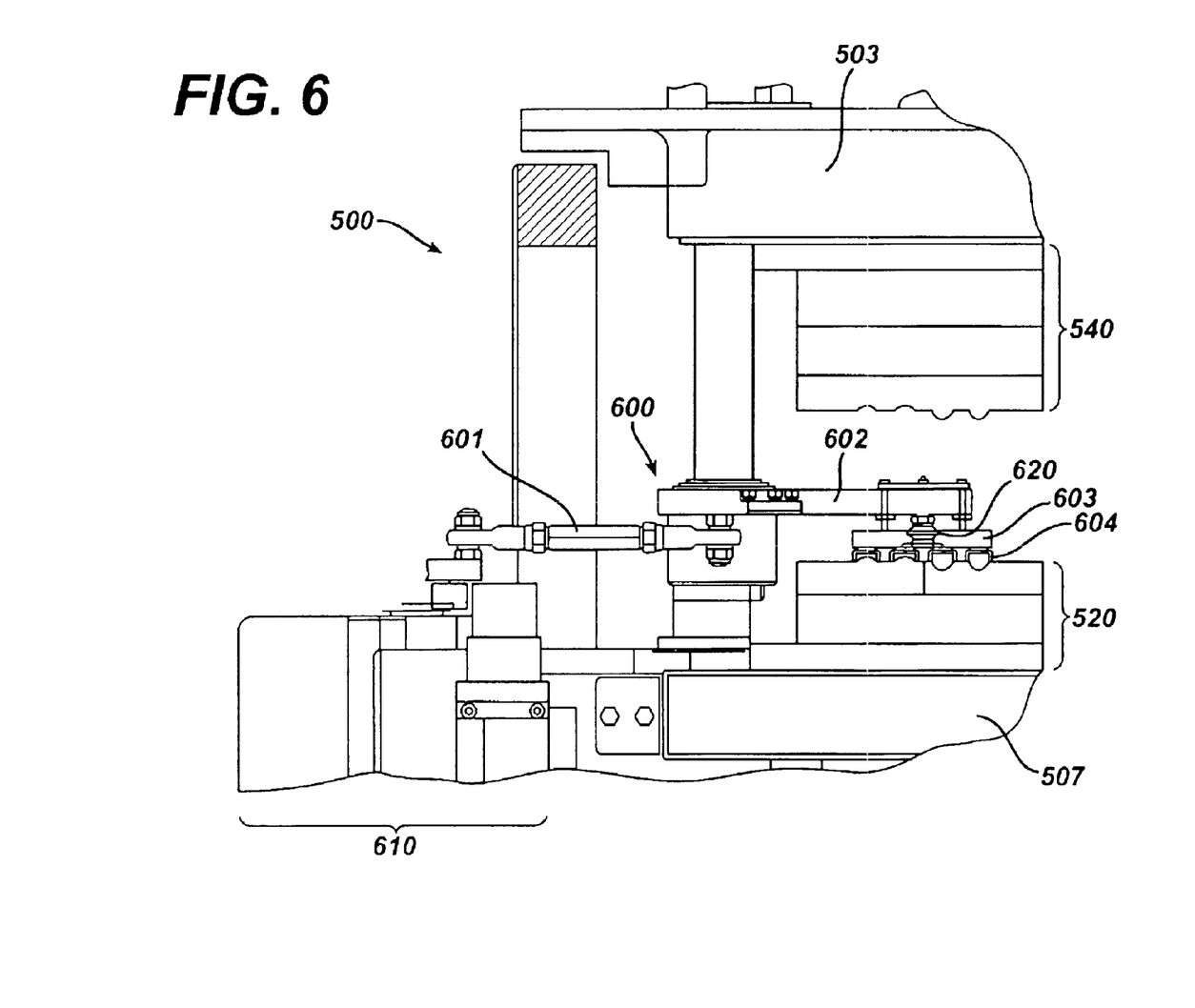
FIG. 6 is an enlarged portion of a vertical molding machine having a mold of this invention, and useful in the method of this invention.
Figure 7:
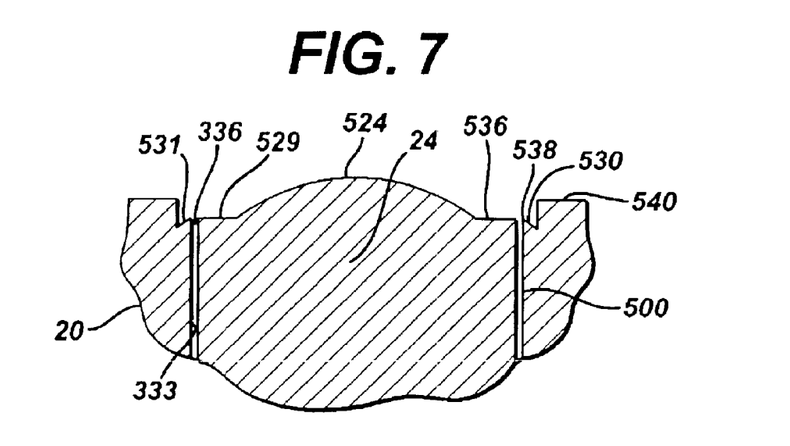
FIG. 7 is an alternate embodiment of the invention, showing a cross-sectional view of a portion of a mold half having an insert therein.
Figure 8:
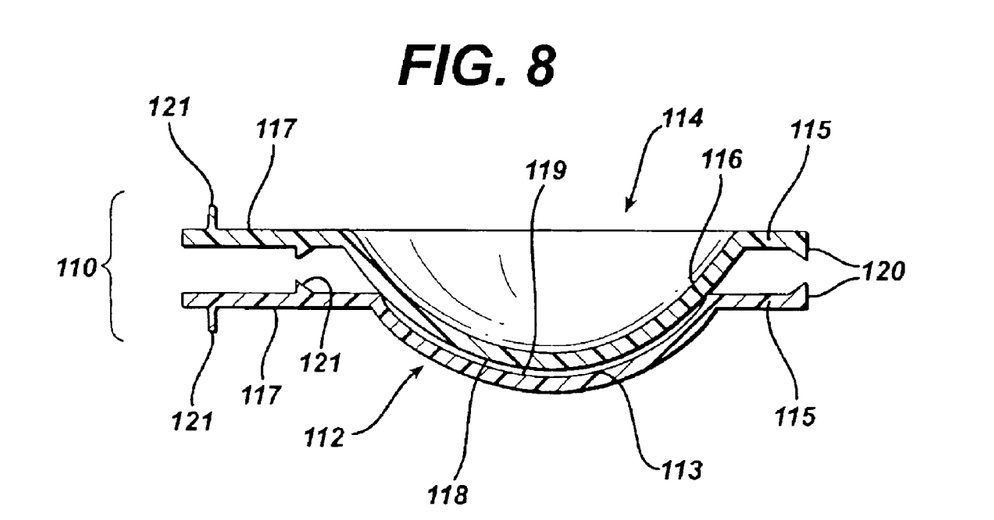
FIG. 8 is a side elevational view of a front curve and back curve assembly, which includes a front curve, and back curve produced using the mold half shown in FIG. 7.

In the preferred mold shown in FIGS. 2–6, the release element is provided to the ophthalmic devices by hollowing-out the inserts 24, 25 preferably in the first (lower) mold half 20 to provide the hollowed-out portion that when the ophthalmic devices are molded will provide for the release element on the lens curves or other molded devices. The insert can be milled anywhere on its top surface 529 (as long as it is not milled in the optically critical surface 524 of the insert). In the preferred embodiment, the insert is milled around its outer circumference to provide a portion of the boundary 530 for the formation of the release element. The ramped surface 531 is formed by the hollowed-out portion of the insert 24. In the preferred embodiment, each insert is fit into a bushing 500 in the cassette 21, 22 (or alternatively fit into an opening provided in a mold half if there is no cassette provided). Each insert preferably has an annular flat portion 536 of the top surface 529 of the insert 24 around the optically critical surface 524 that is in the same plane with a portion 538 of the top surface 540 of the cassette (or mold half) that has been hollowed out to form and define the outside portion of the flange 115 and the tab 117 of the lens curve as shown in FIG. 1. Therefore, the flange and tab of the lens curve are formed partially by annular surface 536 of the insert and partially by surface 538 of the mold half, preferably in the same plane as the surface 536 of the insert. The boundary 530 of the insert provides for the formation of the release element 120 of the lens curve extending from the surface of flange 115 of the lens curve to be molded. Alternatively, instead of or in addition to hollowing-out the top surface of the insert, the portion 538 of the top surface of the cassette (or mold half) could have been hollowed out to provide the release element to the lens curve or other ophthalmic device. FIG. 7 shows an alternative embodiment of the invention in which surface 538 has been milled to provide the hollowed-out portion to define a boundary 530 for the formation of the release element. FIG. 8 shows the lens curves having release elements 120 formed using the insert shown in FIG. 7 in the first mold half of the mold shown in FIG. 2.

FIG. 3 shows the mold 475 in cross-section comprising the first mold half shown in FIG. 2 taken along line 3—3 shown in FIG. 2 and the complementary second mold half that mates with the first mold half to form the cavities that form the ophthalmic devices. The mold 475 is in the open position. FIG. 3 shows the front curve inserts 24, and the back curve inserts 25 in cassettes 21, 22 respectively. Where the first mold half 20 has inserts 24 having convex molding surfaces, the second mold half 440 has complementary inserts 441 having concave molding surfaces. Where the first mold half 20 has inserts 25 having concave molding surfaces, the second mold half 440 has inserts 442 having convex molding surfaces. The preferred arrangement is to put the inserts forming the optically critical surfaces 119 of the front curve 112, (see FIG. 1) and/or (preferably and) the optically critical surfaces 118 of the back curve 114 (see FIG. 1) into the one or plurality, of cassettes which are part of the same mold half, preferably the first mold half 20. In the preferred mode, the inserts for the back curves are in one cassette and the inserts for the front curves are in a separate cassette in the first mold half.

The second mold half 440 can comprise changeable cassettes, comprising inserts for critical and/or non-critical surfaces, which are simply and quickly removable from the second mold half; however, in the preferred mode, the second mold half 440 does not comprise cassettes. Instead, the second mold half preferably comprises a plate, frame, or similar support that holds the inserts that form the non-optically critical surfaces of the front curves and/or (preferably and) the back curves. The inserts 441, 442 preferably fit into the plate, frame, or support and are individually removable from the second mold half; however, the inserts may be contiguous with the plate, frame, or support if desired or as previously stated the mold half would not comprise separate inserts and the top surface of each mold half would be hollowed-out to define the molding cavity.

In the preferred embodiment, the front curve inserts 441 and the back curve inserts 442 of the second mold half 440 are inserted into a plate 443. The plate 443 preferably comprises a metal of the types described above for the cassette, which has been bored out to the substantially exact dimensions of the inserts 441, 442. The plate 443 is mounted onto the hot runner base 444. The plate 443 and hot runner base 444 have extrusion parts (not shown) for the introduction of molten thermoplastic material into the closed mold for forming the front curves and the back curves, similar to those disclosed and described in the prior art. See e.g., U.S. Pat. No. 5,545,366, earlier incorporated herein by reference. In the preferred mode, the second mold half 440 is preferably mounted into an injection molding machine, and is only occasionally removed for service or insert replacement due to wear or damage, because the inserts form the non-critical surfaces of the lens curves. At that time the plate 443 can be removed from the hot runner base 444 and the inserts 441, 442 can be replaced or the entire plate 443 and inserts 441, 442 can be replaced. Such maintenance will typically require that the injection molding machine stop producing ophthalmic devices for greater than fifteen minutes.

The inserts 441, 442 in the second mold half 440 are cooled by circulating water which travels in conduit 448 through the plate 443 and around the smaller diameter portions 449 of the inserts 441, 442. O-rings 450 maintain the water seal around the inserts 441, 442. (Note that the detail shown for 1 of the 4 inserts on the second mold half 440 pertains to all the inserts 441, 442. Additionally, the detail shown for 1 of the 4 inserts on the first mold half 20 pertains to all the inserts 24, 25, except that the detail for inserts 25 in cassette 22 is a mirror image of the detail for the inserts 24 in cassette 21.) The water preferably flows in a single circuit through the plate 443, contacting all the inserts 441, 442 in each circuit. Because the plate 443 is not often removed from the injection molding machine, direct water cooling of the inserts is preferred, although it complicates insert replacement.

In the preferred embodiment, first mold half 20 which carries the cassettes 21, 22, the cooling of the inserts 24, 25 in the first mold half is accomplished using heat transfer blocks 335, instead of the direct cooling described above. The heat transfer blocks and cooling of the mold halves are described in more detail in the references previously incorporated herein by reference. Alternative means for cooling the mold half, e.g. a solid heat pipe with or without cooling fins, or connected to a cooled mass, a heat pipe containing a fluid or refrigerant, with or without cooling fins could be used to cool either mold half.

The heat transfer blocks 335 preferably are made of copper, copper chromium, copper zinc, brass, nickel-coated brass, or similar high heat conductive materials. Steel is also a possible choice, but not necessarily preferred. To improve the heat transfer to the molded parts which need to be cooled, it is also preferred to machine the insert from the enumerated high heat conductive materials.

The second mold half or the inserts in the second mold half preferably do not have a hollowed out portion to provide for a release element. As shown in FIG. 3, the inserts in the second mold half 440 do not have a chamfered edge or other hollowed out portion. No release element is provided for in the second mold half, because in the preferred embodiment, the molded parts will release from the second mold half due to an air ejection step and via subtle anchoring techniques that are provided to the cavities in the mold halves that will cause the molded device to release from the upper mold half and stay on the lower mold half. The subtle anchoring techniques are known to a person of ordinary skill in the art and are optimized by trial and error. The lens curves therefor, will remain on the first mold half 20 when the mold halves are moved away from each other after molding the ophthalmic devices. The preferred injection molding machine is a vertical injection molding machine in which the mold halves are arranged with an upper mold half 440 and a lower mold half 20 as shown in FIGS. 3 and 6. Preferably the molded devices are removed from the upper mold half 440, and remain on the lower mold half. In alternative molding machines the mold halves may be arranged horizontally, i.e. with the opening molding surfaces or top surfaces of the mold halves perpendicular to the ground, the same considerations, including the use of a release element, will have to be made to provide that the molded devices remain on one or the other mold halves.

FIGS. 3 and 5 show the air ejection system for the removal of the front and back curves from the first mold half 20, and the second mold half 440. Alternatively, mechanical ejector pins could be used, or a combination of the mechanical or air ejector pins can be used; however, air ejection is preferred, because air ejection does not distort the ophthalmic devices, and can be done while the molded ophthalmic devices are at a higher temperature, relative to the use of mechanical ejector pins. The air is ejected, preferably pulsed, at approximately 5 to 6 bar over an area of 2 mm by 100 microns to about 3 mm by 300 microns. The air is ejected through gaps 336, 451 around the circumference of the top of each of the inserts 24, 25, 440, 441. The width of the gap 336, 441 is preferably less than 12 microns. Alternatively, a plurality of holes could have been provided around the circumference at the top of the inserts for air ejection.

It is believed that the release elements on the molded devices not only provide ramped surfaces that direct the devices out of the mold half when the molded devices shrink, but also or alternatively, the release elements provide additional surface area upon which the air from the air ejector can act upon to push the molded devices out of the first mold half.

For the second mold half 440, air is provided to gap 451 by channels 447 from a passageway 446, which is hooked up to a pressurized air source (not shown). For the first mold half 20, air is provided to gap 336 by channels 333 from passageway 332 which is hooked up to a pressurized air source (not shown).

The channels 333, 447, which connect to passageways 332, 446, are preferably formed by machining multiple grooves into the cassettes 21, 22 and plate 443 around the diameter of the opening to receive the inserts 24, 25, 441, 442. Alternatively, the channels 333, 447 can be machined into the inserts 24, 25, 441, 442.

FIG. 2 shows the connector nozzles 345 which communicate with passageway 332 and can be connected to the air source (not shown) for cassettes 21, 22. When the first mold half 20, having attached cassettes 21, 22 is removed from the molding machine, or if one or both cassettes 20, 21 are removed from the base 23, of the first mold half 20, the air passageway(s) 332 can be readily disconnected from the air source (not shown) via the connector nozzles 345. Preferably the air source to which the connector nozzles 345 is connected, has one or more valves which can be closed or preferably automatically close when the mold half is removed from the molding machine. The cassettes have at least one nozzle, more preferably each cassette has two nozzles 345, one on each side of each cassette. One nozzle 345 is preferably plugged when the other nozzle 345 is attached to the air source.

Preferably air is ejected in a single blast from all of the gaps 451 around the top of the inserts 441, 442 in the second mold half 440 just prior to and as the first and second mold halves change from a closed position to the open position. The molded lens curves begin cooling immediately after the thermoplastic material is introduced into the cavity defined by the mold halves. The single blast of air removes the front curves and back curves from the second mold half 440 so that the lens curves preferentially adhere to or stay on the first mold half 20. The curves continue to cool, and the release elements push the curves in the release direction as the molded devices shrink. After the mold halves are opened, a single blast of air is ejected from all of the gaps 336 around the top of the inserts 24, 25 in the first mold half 20, which preferably acts upon the added surface area provided by the release element, which removes the front curves and back curves from the first mold half 20. Preferably, the pulse of air from is the first mold half 20 coincides with the movement of a robot 600 (shown in FIG. 6) to a location between the mold halves to pick up the released front curves and back curves. Alternatively, the process can be reversed to have the front curves and back curves remain on the second mold half 440. If it were preferred to have the front curve and back curve release from the first mold half first and the second mold half second, then in addition to making other subtle modifications to the mold halves taking into consideration internal cavity pressures of the lens curves to change the release of the molded devices, the release element would preferably be provided for on the second mold half and therefore on the opposite surface of the lens curves, rather than as shown in FIG. 1. It is also greatly preferred to use air ejection for release on at least one, preferably both, of the mold halves.

Preferably the moveable platen 507 moves between a lower position (as shown) during which the mold is open and a closed position in which the inserts in the upper and lower mold half 540, 520 form the cavities into which a molten thermoplastic is injected. After injection and about 0.5 to 1.5 seconds for cooling of the parts, the mold halves separate as air from the air ejector gaps in the upper mold half pushes the front curves and back curves onto the inserts in the lower mold half 520. The moveable platen 507 and lower mold half 520 move to the open position shown in FIG. 6. The molded lens curves are then removed from the lower mold half 520 preferably via a robot. The preferred robot is shown in FIG. 6.

FIG. 6 shows in detail a portion of the preferred injection molding machine 500, and the preferred robot 600. The robot has been described in greater detail in U.S. Ser. No. 09/305,886, (VTN-424), previously incorporated herein by reference.

After the robot 600 moves horizontally into position between the mold halves, the end of arm tool 603 preferably is lowered close to the surface of the lower mold half 520 (as shown) by vacuum extender 620, which moves the end of arm tool 603 up and down. The vacuum extender 620 is connected to a vacuum source (not shown). (When the vacuum is activated the end of arm tool 603 moves up via contraction of the vacuum extender 620. When the vacuum is deactivated the end of arm tool 603 moves down via extension of the vacuum extender 620.) At this time the lenses are ejected from the lower mold half 520 by the air ejection system. The end of arm tool 603 preferably has cups 604 which are connected to a vacuum source (not shown) which is activated to pick up the air-ejected lens curves (not shown in FIG. 6). When the lower mold half 520 moves toward the stationary upper mold half 540, the robot through the preferred direct drive mechanism moves out from between the upper mold half 540 and lower mold half 520, and transfers the front curves and back curves to another robot (not shown) for proper placement on lens curve pallets (not shown), similar to those described in the prior art.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. Substitutions of elements from one described embodiment to another are also fully intended and contemplated. It is also to be understood that the drawings are not necessarily drawn to scale. It is the intention, therefore, to be limited only as indicated by the scope of the claims appended hereto.

What is claimed is:

1. A method of improving the release of a molded ophthalmic device from a mold comprising the steps of: providing a first mold half and second mold half each having opposing top surfaces at least one of which has been hollowed out to define a cavity for forming said ophthalmic device and at least said first mold half further defining a boundary for a release element, said boundary is part of said cavity, said release element comprising a ramped surface, said cavity having a corresponding ramped surface, said release element having its widest part near the top surface of said at least said first mold half that defines said release element therein and locating said ramped surface of said release element therein and when said device in said mold shrinks, said ramped surface uses the shrinking forces of said device to direct said device out of said first mold half.

2. The method of claim 1 further comprising the step of equipping said first mold half with air ejection, and locating said air ejection, whereby when air is ejected from said air ejection, said air will impinge upon said release element.

3. The method of claim 1 further comprising the steps of placing a thermoplastic in said cavity, cooling said thermoplastic, and directing said ophthalmic device out of said first mold half using said ramped surface of said release element.

4. The method of claim 3 further comprising the step of ejecting air out of said second mold half.

5. The method of claim 4, further comprising the additional step of ejecting air out of the first mold half.

6. The method of claim 1, additionally comprising the steps of placing a thermoplastic in said cavity, cooling said thermoplastic, and directing said thermoplastic out of said first mold half using said ramped surface of said release element, wherein said directing step is accomplished by the shrinkage of said ophthalmic device.

7. A method of improving the release of a molded ophthalmic device from a mold comprising the steps of: providing a first mold half and second mold half each having opposing top surfaces at least one of which has been hollowed out to define a cavity for forming said ophthalmic device and at least said first mold half further defining a boundary for a release element said boundary is part of said cavity, said release element comprising a ramped surface, said cavity having a corresponding ramped surface, said release element having its widest part near the top surface of said at least said first mold half that defines said release element therein and wherein said release element has an annular shape and a triangular cross-section.

8. The method of claim 7, wherein said ophthalmic device is a lens curve.

9. The method of claim 7, wherein said ophthalmic device is a lens curve comprising a flange and said release element is located on said flange.

10. The method of claim 7, wherein said first mold half comprises an insert, and said step of providing is accomplished by hollowing-out a portion of said insert to provide said boundary for said release element.

11. A mold for forming an ophthalmic device, said mold comprising a first mold half and second mold half each having opposing top surfaces at least one of said top surfaces being hollowed out to define a cavity for forming said ophthalmic device, and at least said first mold half having a hollowed-out portion defining a release element, said hollowed-out portion being part of said cavity, said hollowed-out portion comprising a ramped surface, and being widest near the top surface of said at least said first mold half, wherein said ramped surface of said hollowed-out portion being located within the cavity to take advantage of a shrinking force of said ophthalmic device within said mold to move said molded device along said ramped surface of said cavity.

12. The mold of claim 11, wherein said ophthalmic device is a lens curve.

13. The mold of claim 11, wherein said release element has an annular shape.

14. A mold for forming an ophthalmic device, said mold comprising a first mold half and second mold half each having opposing top surfaces at least one of said ton surfaces being hollowed out no define a cavity for forming said ophthalmic device, and at least said first mold half having a hollowed-out portion defining a release element, said hollowed-out portion being part of said cavity, said hollowed-out portion comprising a ramped surface, and being widest near the top surface of said at least said first mold half, wherein said release element is a lens curve and has a triangular cross-section.

15. The mold of claim 11, further comprising air ejecting means.

16. The mold of claim 15, whereby said ejecting means are located to direct air at said release element of said molded device.

* * * * *